United States Patent
Mörbe et al.

(10) Patent No.: US 8,072,783 B2
(45) Date of Patent: Dec. 6, 2011

(54) INPUT CIRCUIT FOR A SWITCH-MODE POWER SUPPLY

(75) Inventors: Stefan Mörbe, Hasbergen (DE);
Michael Bothe, Münster (DE)

(73) Assignee: Power Systems Technologies GmbH, Ostbevern (DE)

( * ) Notice: Subject to any disclaimer, the term of this patent is extended or adjusted under 35 U.S.C. 154(b) by 579 days.

(21) Appl. No.: 12/064,289

(22) PCT Filed: May 4, 2006

(86) PCT No.: PCT/EP2006/004194
§ 371 (c)(1),
(2), (4) Date: Mar. 20, 2008

(87) PCT Pub. No.: WO2007/022808
PCT Pub. Date: Mar. 1, 2007

(65) Prior Publication Data
US 2008/0192516 A1    Aug. 14, 2008

(30) Foreign Application Priority Data
Aug. 23, 2005  (DE) .......................... 10 2005 039 867

(51) Int. Cl.
*H02M 1/00*    (2007.01)
*H02M 7/00*    (2007.01)
(52) U.S. Cl. .......................................... 363/49; 363/125
(58) Field of Classification Search ............ 363/49, 363/52, 89, 125–127; 323/901
See application file for complete search history.

(56) References Cited

U.S. PATENT DOCUMENTS
4,638,226 A * 1/1987 Damiano et al. .............. 318/246
5,202,819 A   4/1993 Min
(Continued)

FOREIGN PATENT DOCUMENTS
DE    10146868    4/2008
(Continued)

OTHER PUBLICATIONS

De Souza et al, A New ZVS Semiresonant High Power Factor Rectifier with Reduced Conduction Losses, Feb. 1999, IEEE Transaction on Industrial Electronics, vol. 46 No. 1, pp. 82-90.*

(Continued)

*Primary Examiner* — Adolf Berhane
*Assistant Examiner* — Emily Pham
(74) *Attorney, Agent, or Firm* — Per H. Larsen; Robert G. Grouch; Marsh Fischmann & Breyfogle LLP

(57) ABSTRACT

The invention relates to an input circuit for a logic circuit part, comprising a voltage converter component for conversion of a mains voltage to the required low voltage in order to supply a user with a low voltage. The supply to the input circuit may hence be connected to a mains supply to rectify the mains voltage and an output from the input circuit may be connected to the voltage converter component to provide a rectified input voltage for the voltage converter component. According to the invention, an improved input circuit for a logic circuit part with improved functionality and operating security also permitting an extensive miniaturization and simplified production may be achieved by replacement of at least two of the remaining four diodes in the rectifier part of an input circuit for a logic circuit part by two controllable switches which work as a synchronous rectifier and are connected such as to be switched on and off by alternate forced control.

16 Claims, 5 Drawing Sheets

U.S. PATENT DOCUMENTS

| | | | |
|---|---|---|---|
| 5,495,394 A * | 2/1996 | Kornfeld et al. | 361/764 |
| 5,977,640 A * | 11/1999 | Bertin et al. | 257/777 |
| 6,009,008 A | 12/1999 | Pelly | |
| 6,198,136 B1 * | 3/2001 | Voldman et al. | 257/357 |
| 6,486,535 B2 * | 11/2002 | Liu | 257/666 |
| 6,563,719 B1 * | 5/2003 | Hua et al. | 363/21.06 |
| 6,570,366 B1 * | 5/2003 | Lin et al. | 323/207 |
| 6,583,993 B2 * | 6/2003 | Hua | 363/21.06 |
| 6,594,131 B2 * | 7/2003 | Umekawa | 361/93.7 |
| 6,611,130 B2 * | 8/2003 | Chang | 323/235 |
| 6,628,532 B1 * | 9/2003 | Rinne et al. | 363/21.06 |
| 7,531,852 B2 * | 5/2009 | Ueda et al. | 257/203 |
| 2001/0002329 A1 | 5/2001 | Ling | |
| 2003/0142513 A1 * | 7/2003 | Vinciarelli | 363/17 |
| 2004/0008013 A1 | 1/2004 | Gay | |
| 2004/0090726 A1 * | 5/2004 | Ball | 361/93.9 |
| 2005/0036339 A1 * | 2/2005 | Zverev et al. | 363/22 |
| 2005/0105311 A1 | 5/2005 | Soldano | |
| 2005/0255677 A1 * | 11/2005 | Weigold et al. | 438/471 |
| 2005/0265057 A1 * | 12/2005 | Zhang et al. | 363/127 |
| 2006/0198172 A1 | 9/2006 | Wood | |
| 2007/0058402 A1 * | 3/2007 | Shekhawat et al. | 363/89 |

FOREIGN PATENT DOCUMENTS

| | | |
|---|---|---|
| JP | 57119674 A | 9/1982 |
| JP | 03093473 | 4/1991 |
| JP | 10027893 A | 1/1998 |
| JP | 11178342 A | 7/1999 |
| JP | 2003284344 A | 10/2003 |
| JP | 2004072846 A | 3/2004 |
| JP | 2004079870 | 3/2004 |
| WO | 9601003 | 1/1996 |

OTHER PUBLICATIONS

PCT/EP2006/004194 International Search Report.
German Office Action dated Jan. 16, 2007.

\* cited by examiner

--- switched off
— switched on

--- switched off
— switched on

INPUT CIRCUIT FOR A SWITCH-MODE POWER SUPPLY

BACKGROUND OF THE INVENTION

The invention relates to an input circuit for a switched-mode power supply, comprising a voltage transformer unit for transforming a mains voltage to the required low voltage in order to supply a consumer with a low voltage. An input of the input circuit is connectable to the mains voltage to rectify the mains voltage, and an output of the input circuit is connectable to the voltage transformer unit to provide a rectified input voltage for the voltage transformer unit.

Modern switched-mode power supplies in the low-power field, e.g. chargers for mobile phones and the like, have been substantially reduced in size by now due to a number of innovations with respect to the components and circuit technology. The dimensions and the weight are of major importance specifically for travelers. Therefore, one focal point in today's advancements is on miniaturizing the function of such a switched-mode power supply to an extent that allows, in the ideal case, its integration into the terminal device. Due to the high cost pressure along with the fulfillment of pertinent safety standards specifically the input wiring on the primary side of such a switched-mode power supply was more and more reduced with respect to size and the number of components and, in known configurations, is nowadays substantially formed of a fuse resistor, a bridge rectifier and a Π-filter.

FIG. 1 shows a circuit according to the prior art with the characteristic values for a 3 W switched-mode power supply. Moreover, the parasitic elements are illustrated. In this input wiring, the resistor $R_{limit}$ fulfills several functions: It allows a starting current limitation to values below the maximum surge current $I_{surge}$ of the four diodes of the rectifier. It fulfills a safety function by permitting a defined release behavior if the power supply breaks down, and it reduces the pulse voltage for the power supply in transients.

Apart from the mechanical dimensions of the rectifier diodes (or a function-compatible bridge rectifier), which are in conflict with a desired miniaturization, the input wiring shown in FIG. 1 has some more disadvantages. On the one hand, the electrical load on the input wiring during the start-up leads to a reduction in reliability and service life. On the other hand, the function of the resistor $R_{limit}$ per se is not reversible, so that an ongoing use of the switched-mode power supply is no longer possible even if only a temporary malfunction has occurred. Moreover, the known configuration as shown in FIG. 1 is not at all protected against a short-term overvoltage of the mains, which occurs comparatively often in countries having a poor supply quality when operated by emergency power supplies.

Therefore, it is the object of the present invention to provide an improved input circuit for a switched-mode power supply which, apart from an increased functionality and operational safety, simultaneously permits an advanced miniaturization and simplified manufacturability.

SUMMARY OF THE INVENTION

This object is achieved with the subject matter of the independent patent claims. Advantageous advancements of the present invention are defined in the dependent claims.

The present invention is based on the idea to replace at least two of the commonly used four diodes in the rectifier part of an input circuit of a switched-mode power supply by two controllable switches, which act as synchronous rectifiers and are connected in such a way that they can be switched on and off by alternate forced control.

The two controllable switches are thereby alternately switched on and off in the rhythm of the mains frequency. The solution according to the invention has the advantage that it is possible to limit the starting current and to reduce all other components with respect to their dimensions. This allows a reduction of the mounting space and of the costs for the input circuit according to the invention. At the same time, the reliability of the overall configuration is increased, and a reversible protection function is possible in case of the occurrence of temporary malfunctions.

According to an advantageous embodiment of the present invention so-called insulated gate bipolar transistors (IGBT) are provided as controllable switches. IGBTs have very generally the advantage that, like bipolar transistors, they have a low forward resistance, but substantially lower forward power losses as compared to comparable field effect transistors. Like with the field effect transistor, the activation of the IGBT takes place nearly with no power. The blocking voltage is high, and as the IGBT limits the load current it also has a certain robustness with respect to short circuits.

According to an advantageous embodiment, for example, a voltage proportional to the input current is measured by a resistor and, if a predetermined maximum value is exceeded, the current is limited by a superimposed linear control of the controllable switches. By this limitation of the starting current all of the necessary components of an input circuit are subjected to stress to a smaller extent, and the service life as well as the reliability of the overall switched-mode power supply are improved.

If the peak current through the rectifiers, with a maximum input voltage of 264 VAC, is approximately 18 A, this value can be reduced to 0.3 A by means of the limitation of the starting current according to the invention. As a consequence thereof the chip surface of the diodes, which are oversized in conventional input circuits with respect to the starting impulse, can be reduced from about 0.8 mm$^2$ per diode to about 0.2 mm$^2$ per diode. Due to the small electrical load the chip surface of the IGBTs can likewise remain very small and is below 0.8 mm$^2$.

Instead of the 3 W wire-wound resistor provided in prior solutions, with a diameter of 4 mm and a length of 11 mm, a resistor, for example, of the 0603 model with dimensions of 1.5 mm×0.75 mm may thus be used as current-limiting resistor.

By choosing an appropriate resistance value, moreover, the maximum value of the current can be influenced within certain boundaries and can be adjusted to very narrowly tolerated values, for example, by aligning the resistor by means of laser trimming.

According to the invention there are provided switch-off means in the case of excess current, which switch off entirely reversibly and very fast with a delay of less than 2.5 ms corresponding to the 90°-value of the rectified mains frequency. While the conventional input resistor blows like a known fuse, thereby rendering the device unusable, such an excess-current release merely disconnects the device from the mains and the switched-mode power supply can be put back into operation by unplugging it for a short time and inserting it back into the mains socket.

Advantageously, a safety function can be provided whereby, if the module breaks down, a bonding wire in the power circuit blows and/or the resistor R1 is embodied as a fuse resistor. This enhances the safety of the overall circuit substantially.

When realized as an application-specific integrated circuit (ASIC), moreover, additional functions may be integrated. Desirable is, for example, an undervoltage/overvoltage shutdown if the mains voltage is too high/too low. While the undervoltage shutdown is rather an amenity switching off the device in a defined manner, for example, in the event of a power failure, the overvoltage shutdown offers an effective protection of the device in case of the frequently occurring, usually short-term mains voltages outside the nominal voltage guaranteed by the electric power station, plus a deviation of 10%. During operation by only moderately regulated emergency power supplies, which are frequently encountered, for example, in developing countries having a chronic under-supply, the switched-mode power supply is efficiently and reversibly protected by the inventive input circuit.

Altogether, the input circuit according to the invention can be manufactured as an integrated circuit with a significantly reduced physical size, in spite of the considerably increased scope of functions. This results in new dimensions for the miniaturization.

BRIEF DESCRIPTION OF THE DRAWINGS

The invention shall be explained in more detail below by means of the embodiments illustrated in the appended drawings. Like or corresponding details are provided with like reference numbers throughout the figures. In the drawings.

DETAILED DESCRIPTION

Figure 2:
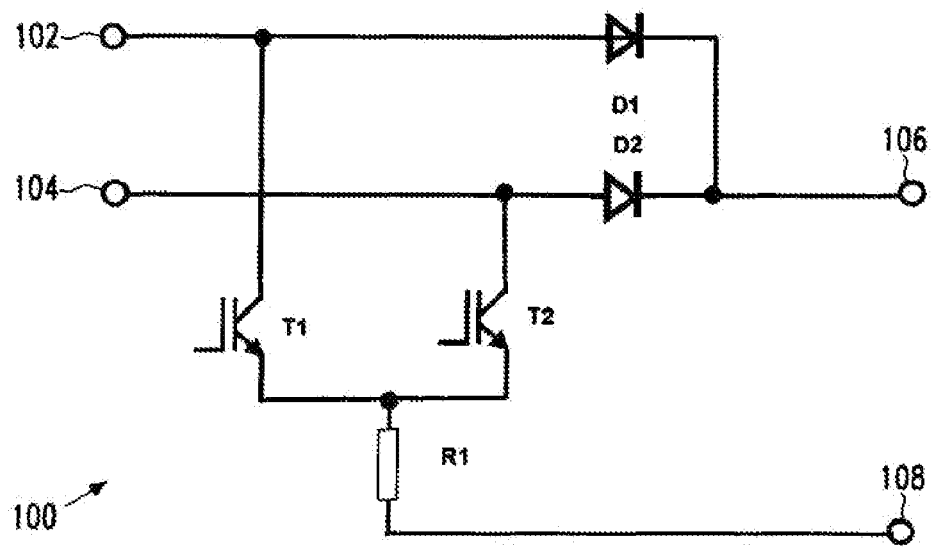
FIG. 2 shows a circuit diagram of a basic circuit of the input circuit according to the invention.

With reference to FIG. 2, the basic circuit of an input circuit according to the invention for a switched-mode power supply shall be looked at more closely below.

Figure 1:
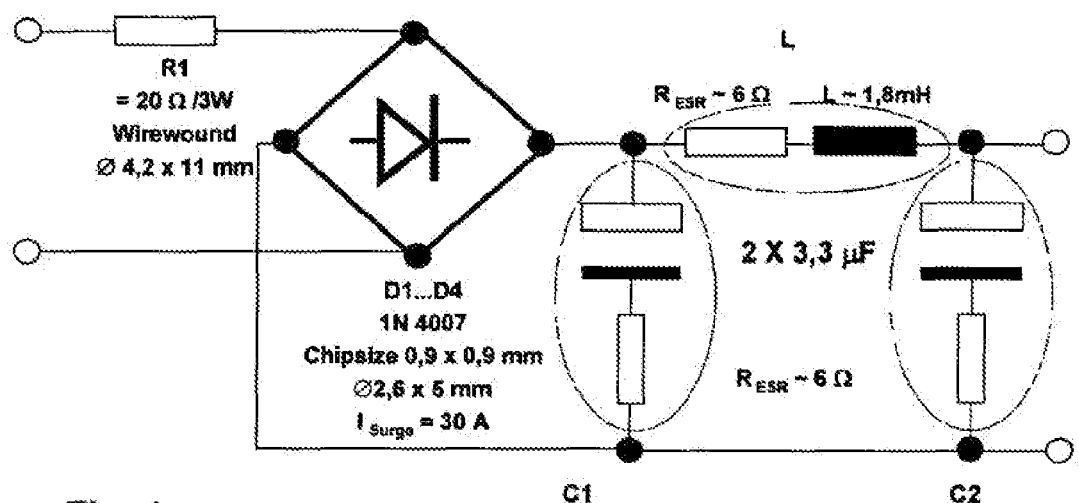
FIG. 1 shows a circuit diagram of a known input wiring of a 3 W switched-mode power supply including an indication of the characteristic values.

The input circuit 100 comprises input terminals 102, 104 to which the mains voltage may be applied. Output terminals 106, 108 are connectable to a non-illustrated voltage transformer unit of a switched-mode power supply so as to provide a rectified voltage for the voltage transformer unit. According to the invention, two diodes D1, D2 and two insulated gate bipolar transistors T1 and T2 instead of the four rectifier diodes shown in FIG. 1 are interconnected to form the rectifier bridge.

The transistors T1, T2 thereby act as synchronous rectifiers, that is, they are alternately switched on and off in the rhythm of the mains frequency applied to the terminals 102, 104. As can further be seen from the following figures, a superimposed linear control of transistors T1, T2 limits the current through these transistors and thus also through the succeeding current-limiting resistor R1 to a predetermined maximum value. The current-limiting resistor R1 of FIG. 2 is therefore loaded by significantly lower currents than the current-limiting resistor $R_{limit}$ of FIG. 1. The resistor R1 can be realized, for example, as model 0603 with dimensions of 1.5 mm×0.75 mm.

Figure 3:
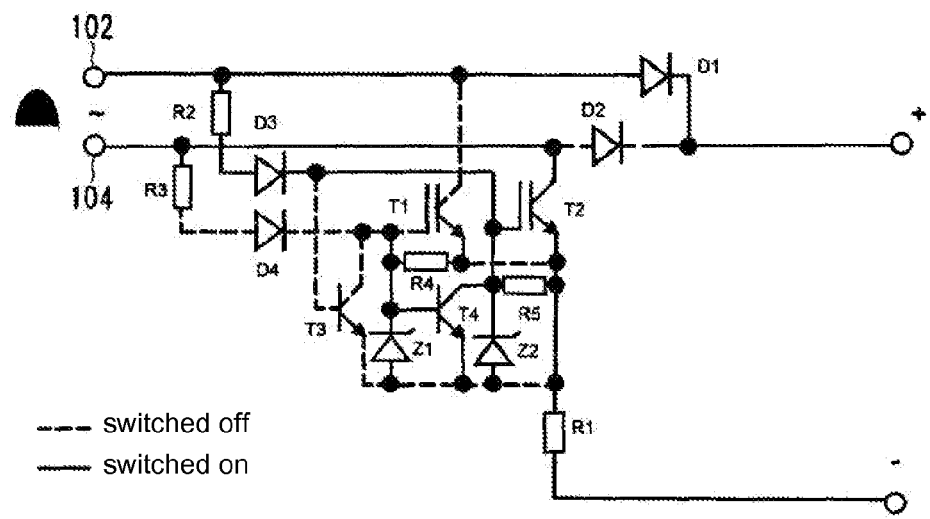
FIG. 3 shows a first embodiment of the input circuit according to the invention during a positive half-wave of the mains voltage.
Figure 4:
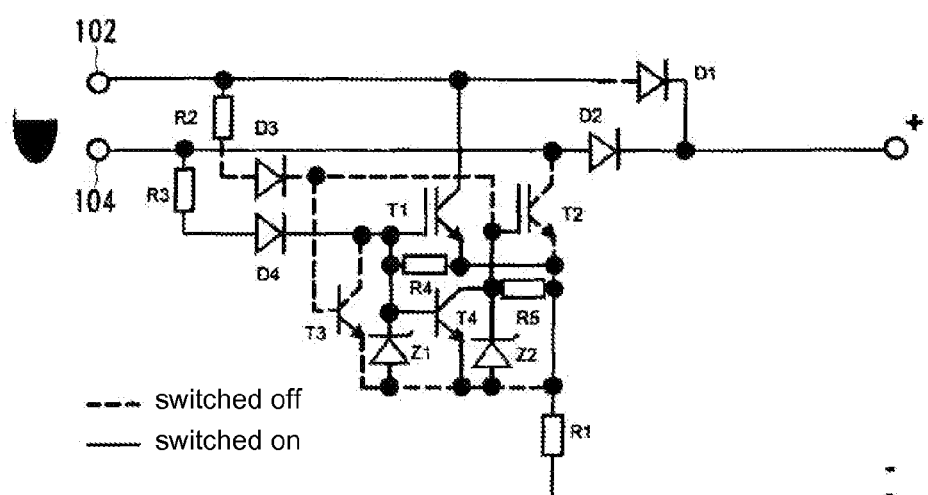
FIG. 4 shows the circuit of FIG. 3 during the negative half-wave of the mains voltage.

The input circuit 100 according to the invention and its operating mode will be explained in detail by means of a first possible embodiment, which is shown in FIGS. 3 and 4.

The resistors R2, R3 serve the measurement of a voltage being proportional with respect to the input current and permitting, if a predetermined maximum value is exceeded, a limitation of the current by a superimposed linear control of the transistors T1 and T2. As was mentioned before, the size of the current-limiting resistor R1 is thus reduced as compared to previously known input circuits.

The control of the transistors T1, T2 for the synchronous rectification is accomplished in a self-controlled manner, whereby each half-wave of the mains voltage at the terminals 102, 104 connects one of the transistors T1, T2 through and simultaneously cuts off the opposite one.

This is shown in FIG. 3 for the positive half-wave and in FIG. 4 for the negative half-wave. The arms shown as a dashed line are each switched off, while the arms shown in a continued line are switched on.

The transistor T2 is switched on by the diode D3 and the resistor R2. The Zener diode Z2 thereby serves as voltage limiter. The resistor R5 separates the gate from ground to prevent an undesired switching on, for example, in the event of mains transients or surge pulses. At the same time, however, D3 and R2 also activate the transistor T3, which short-circuits the gate of transistor T1 and deactivates it. The control of switches T1, T2 for the negative half-wave, which is shown in FIG. 4, is performed analogously to the positive half-wave.

An advantage of the switch-over between positive and negative half-wave is that after the zero crossing there remain, even in the most critical case, about 2 ms during which no current is flowing. Thus, the commutation of the transistors T1, T2 is free of losses, and there are no special requirements for the switching speed.

A small power loss ensured with the inventive circuit by a saturation voltage $U_{CE\ sat}$ of less than 3 V is thereby an essential, positive property of the input circuit according to the invention.

Figure 5:
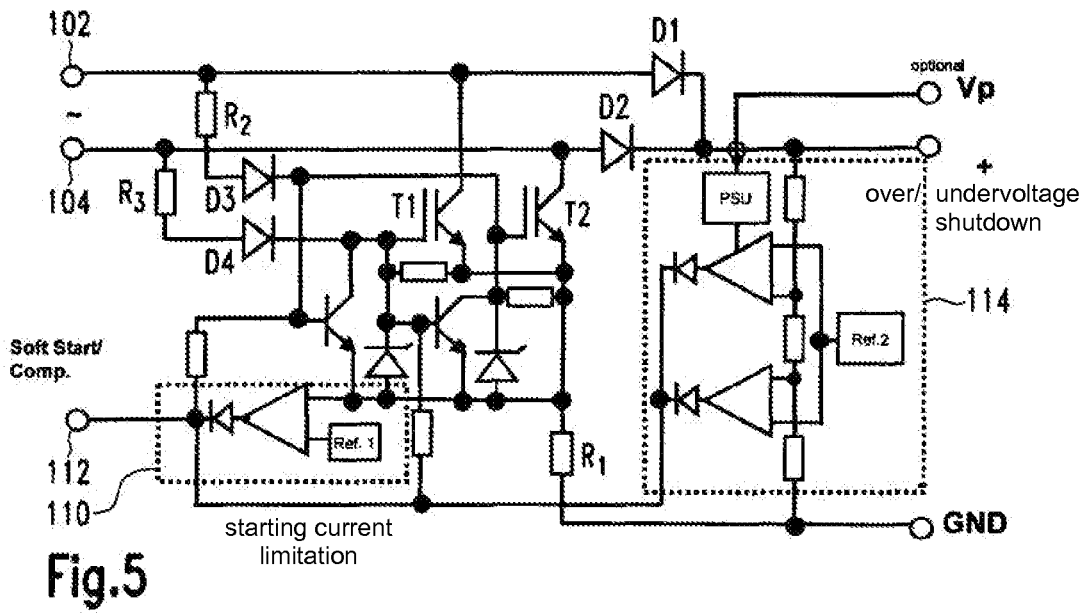
FIG. 5 shows a second advantageous embodiment of the input circuit according to the invention.

In addition to the components shown in FIG. 3 and 4, a current regulator 110 and an undervoltage/overvoltage shutdown mechanism 114 is integrated in FIG. 5. The current regulator 110 compares the current-proportional voltage drop at resistor R1 with a first reference voltage Ref 1 and regulates the current by proportionally turning off the transistors T1 and T2. A corresponding peak current limitation and time characteristic can be formed by an external soft-start capacitor which is connected to terminal 112.

To obtain the under-/overvoltage shutdown 114, the rectified output voltage is detected by a window comparator, is compared with a second reference voltage Ref 2 and is switched off by the transistors T1 and T2.

The voltage supply is thereby effected either on-chip by a high-voltage series regulator from the rectified voltage or from the auxiliary winding of the succeeding switched-mode power supply which, in turn, supplies the pulse width modulator.

Figure 6:
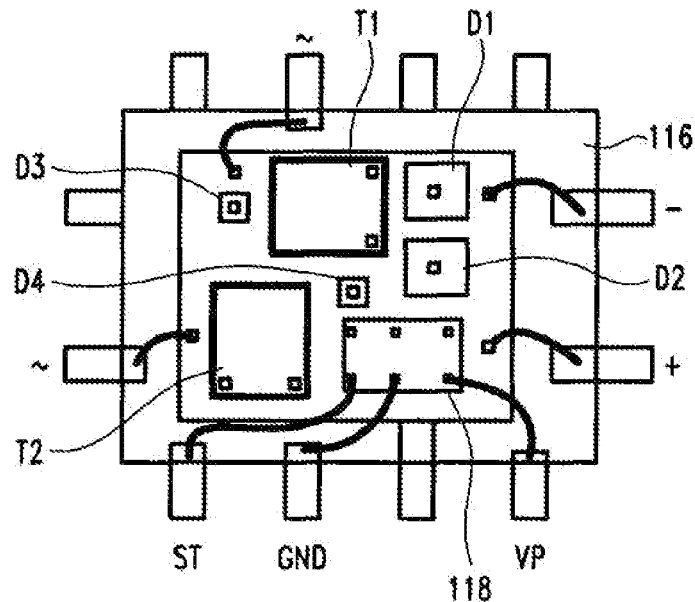
FIG. 6 shows a schematic representation of a realization of the input circuit according to the invention as a monolithically integrated circuit on a SOI wafer.

If the module breaks down, the current is no longer limited to values below 0.3 A. As is shown in FIG. 6, a bonding wire 116 connecting the lead frame of the power branch of the module to the chip is, in this case, heated and burns through. This bonding wire 116 can be manufactured with very small thickness tolerances and, due to the automatic manufacturing process, also with very small length tolerances. In combination with an encapsulation by extrusion-coating this results in a reproducible release characteristic.

A possibly redundant safety function can, moreover, be achieved by configuring the current-sensing resistor R1 as a fuse resistor, which blows in the case of an overcurrent.

The manufacture of the input circuit according to the invention may be accomplished in different ways. On the one hand, the input circuit may be built up as a silicon-on-insulator (SOI) wafer and housed in a standard package. This monolithic integration of the input circuit on a SOI wafer in a standard package is schematically represented in FIG. 6. The realization of the input circuit on a SOI wafer allows the complete monolithic integration of the total circuit on one chip, whereby not only the necessary insulating strength of the components with respect to each other is guaranteed, but also the implementation of additional mixed signal functions. As a result of the smaller dimensions of the power components as compared to the known circuits the additional costs for a SOI wafer are more than compensated with respect to a manufacture in silicon. A view at the costs for the overall system shows a clear cost reduction. The SOI chip shown in FIG. 6 may be implemented in a standard package, and the overall dimensions of the input circuit then amount to about 3 mm×3 mm.

Figure 7:
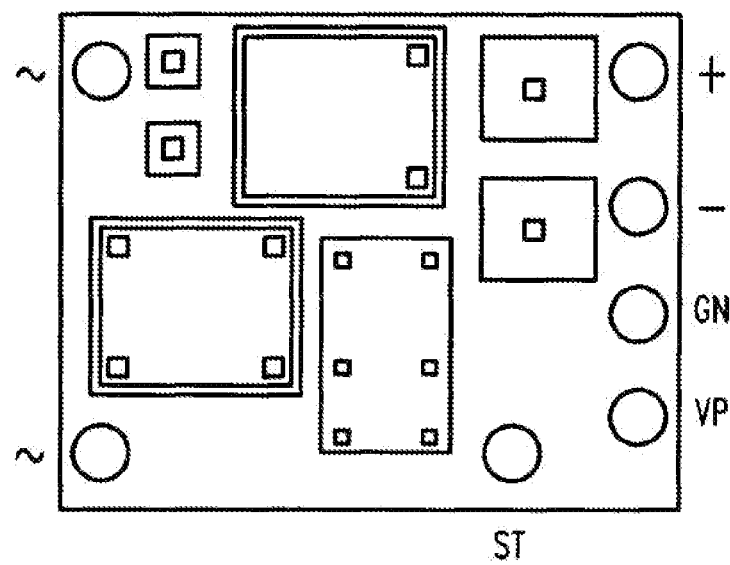
FIG. 7 shows an alternative embodiment of the input circuit according to the invention as SOI flip-chip for the direct assembly on a circuit board.

Alternatively, the input circuit according to the invention can be realized as a SOI flip-chip for a direct circuit board assembly. This embodiment is illustrated in FIG. 7. In addition to the general advantages of a flip-chip assembly, which is one of the most advanced assembly techniques in today's microelectronics, such as the extreme miniaturization, highest mounting density and low costs, the SOI flip-chip embodiment shown in FIG. 7 permits, due to the omission of an additional package, dimensions of about 1.5 mm×1.5 mm. In the case as shown, alone the current-sensing resistor R1 serves as fuse because a bonding wire as provided in FIG. 6 is no longer present.

Figure 8:
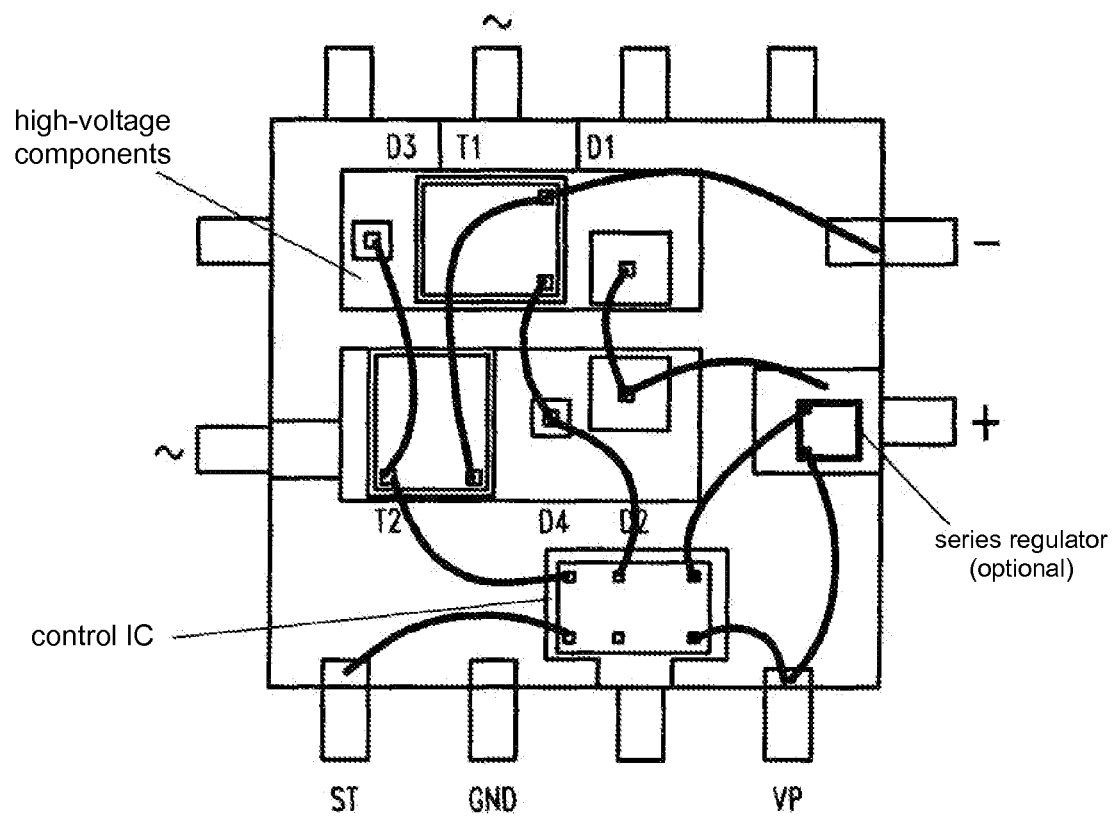
FIG. 8 shows an alternative embodiment of the input circuit according to the invention as single chips in a multilead frame package.

According to another advantageous embodiment the input circuit according to the invention can also be built up as a single chip in a multilead frame package. This is schematically shown in FIG. 8. The functions of the circuits shown in FIGS. 3 to 5 are thereby divided into single chips, and the single chips are integrated into a multilead frame package (MLP) as so-called "system in a package". The so obtained dimensions are 4 mm×4 mm, but permit the possibility of incorporating more functionality and of ensuring a greater flexibility for an adoption to other fields of application.

Figure 9:
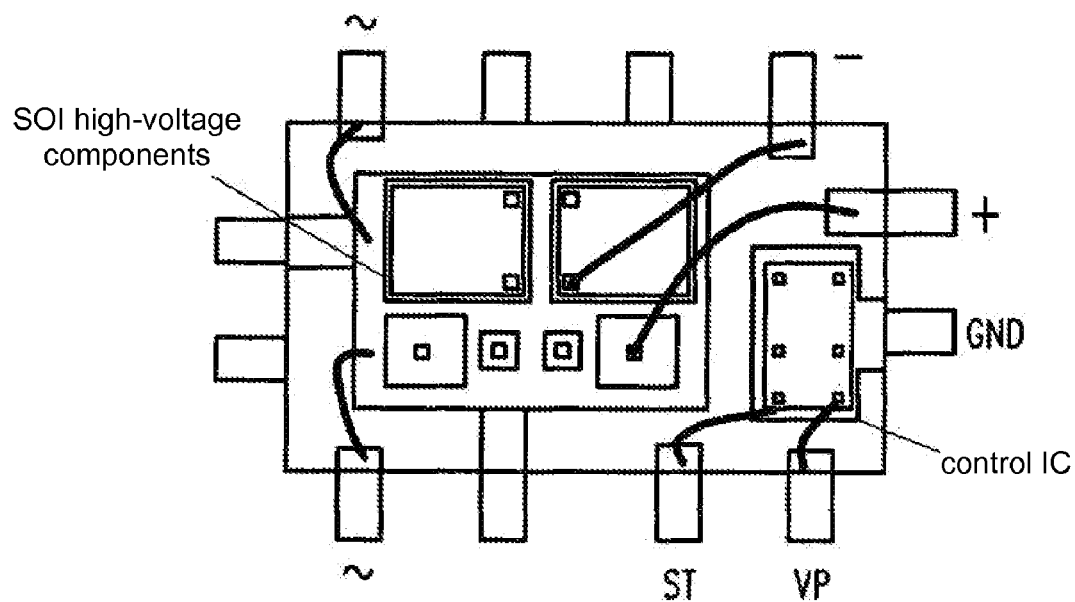
FIG. 9 shows an alternative embodiment of the input circuit according to the invention as SOI high-voltage components with a separate low-voltage ASIC in a multilead frame package.

Moreover, the input circuit according to the invention can also be built up as a mixed form comprised of SOI power components and a separate low-voltage control IC 118 in a multilead frame package. This embodiment is illustrated in FIG. 9. By means of this partial implementation in SOI technology not only an improved insulation of the high-voltage components with respect to the separate low-voltage ASIC 118 can be obtained, but also slightly reduced dimensions as compared to the embodiment shown in FIG. 8. The dimensions are here about 3 mm×3 mm.

Figure 10:
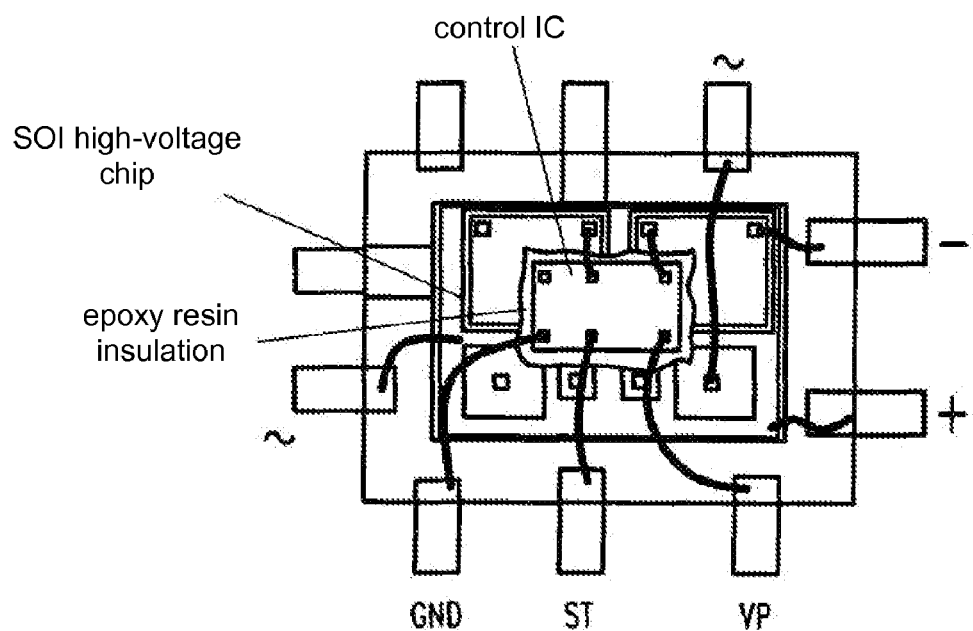
FIG. 10 shows an alternative embodiment of the input circuit according to the invention as SOI high-voltage components with a separate low-voltage ASIC as chip-on-chip configuration in a multilead frame package.

The smallest required area along with extensive functionality is shown in the embodiment of FIG. 10. In this configuration, the power components are manufactured in SOI technology, and the necessary control IC 118 is realized as a separate low-voltage control IC and mounted on the SOI components by way of a chip-on-chip assembly.

An epoxy resin insulation provides for the necessary electrical insulation, and the total arrangement is housed in a multilead frame package. With a total size of approximately 2 mm×2 mm this constitutes, apart from the flip-chip solution, the smallest modification. By the epoxy-resin-insulated assembly of the smaller control IC on the larger SOI high-voltage IC the additionally required area for the control IC can, as compared to the solution of FIG. 8, be shifted to the third dimension.

The input circuit according to the invention and the switched-mode power supplies using such an input circuit first permit the possibility of a substantially miniaturized configuration of the circuit componentry in a switched-mode power supply.

Furthermore, extensive functions are comprised by the inventive embodiments, without increasing the need for volume. Thus, a starting current limitation to values below 0.3 A and, along with it, an improvement of the reliability can be achieved. It is possible to provide a reversible switch-off function. At the same time, a soft start function can be provided. An overvoltage/undervoltage shutdown mechanism can be integrated. Furthermore, the robustness of the operation in instable power systems can be increased, and there is an option to generate the start-up and/or operating voltage for a pulse width modulation IC of the connected switched-mode power supply. Moreover, the present input circuit for a switched-mode power supply may be pathbreaking for a fully integrated "system in a package" function of the electronics of a switched-mode power supply.

The invention claimed is:

1. Input circuit for a switched-mode power supply, the switched mode power supply including a voltage transformer unit for transforming mains voltage to the required low voltage in order to supply a consumer with a low voltage, wherein an input of the input circuit is connectable to the mains voltage to rectify the mains voltage, and an output of the input circuit is connectable to the voltage transformer unit to provide a rectified input voltage for the voltage transformer unit, the input circuit comprising:

at least two controllable switches which act as synchronous rectifiers and are connected in such a way that they can be switched on and off by alternative force control; and a startup current limiting circuit that limits current flowing through the controllable switches at a startup condition to provide for a soft start.

2. Input circuit according to claim 1, wherein the controllable switches are formed by insulated gate bipolar transistors.

3. Input circuit according to claim 1, wherein high-voltage components of the input circuit are manufactured as monolithically integrated solution on a SOI wafer and a control circuit for the input circuit is manufactured on a silicon wafer, and wherein the high-voltage components and the control circuit are arranged as dies by the way of chip-on-chip assembly.

4. Input circuit according to claim 1, further including a capacitor for adjusting a time constant for the soft start.

5. Input circuit according to claim 1, further including an overcurrent protection circuit that switches off current flowing through the controllable switches if a predetermined maximum current is exceeded during operation.

6. Input circuit according to claim 5, further including a resistor for adjusting the value of the maximum current.

7. Switched-mode power supply, comprising an input circuit according to claim 1.

8. Input circuit according claim 1, further including a current-sensing resistor for providing a safety function if a functional breakdown of the switched-mode power supply occurs.

9. Input circuit according to claim 1, further including a voltage protection circuit that implements an under- and/or overvoltage protection function for switching off the switched-mode power supply if the mains voltage is too low or too high.

10. Switched-mode power supply according to claim 7, wherein the input circuit generates a start-up and/or operating voltage for a pulse width modulation control of the switched-mode power supply.

11. Input circuit according to claim 1, which is manufactured as a monolithically integrated circuit on a SOI wafer and is housed in a standard package.

12. Input circuit according to claim 1, which is manufactured as a monolithically integrated circuit on a SOI wafer and is directly mountable on the circuit board without being housed.

13. Input circuit according to claim 1, wherein individual components of the circuit are manufactured as single chips on a silicon wafer and the input circuit is housed in a multilead frame package.

14. Input circuit according to claim 1, wherein high-voltage components of the input circuit are manufactured as monolithically integrated solution on a SOI wafer and a control circuit for the input circuit is manufactured on a silicon wafer, and wherein the high-voltage components and the control circuit are arranged in a multilead frame package.

15. Input circuit for a switched-mode power supply, the switched mode power supply including a voltage transformer unit for transforming mains voltage to the required low voltage in order to supply a consumer with a low voltage, wherein an input of the input circuit is connectable to the mains voltage to rectify the mains voltage, and an output of the input circuit is connectable to the voltage transformer unit to provide a rectified input voltage for the voltage transformer unit, the input circuit comprising:
   at least two controllable switches which act as synchronous rectifiers and are connected in such a way that they can be switched on and off by alternative force control; and
   an overcurrent protection circuit that switches off current flowing through the controllable switches, the overcurrent protection circuit configured to switch off the current reversibly if a predetermined maximum current is exceeded during operation.

16. Input circuit for a switched-mode power supply, the switched mode power supply including a voltage transformer unit for transforming mains voltage to the required low voltage in order to supply a consumer with a low voltage, wherein an input of the input circuit is connectable to the mains voltage to rectify the mains voltage, and an output of the input circuit is connectable to the voltage transformer unit to provide a rectified input voltage for the voltage transformer unit, the input circuit comprising:
   at least two controllable switches which act as synchronous rectifiers and are connected in such a way that they can be switched on and off by alternative force control; and
   a voltage protection circuit that implements an under- and/or overvoltage protection function in such a way that the under- and/or overvoltage protection function is reversible.

* * * * *